UNITED STATES PATENT OFFICE.

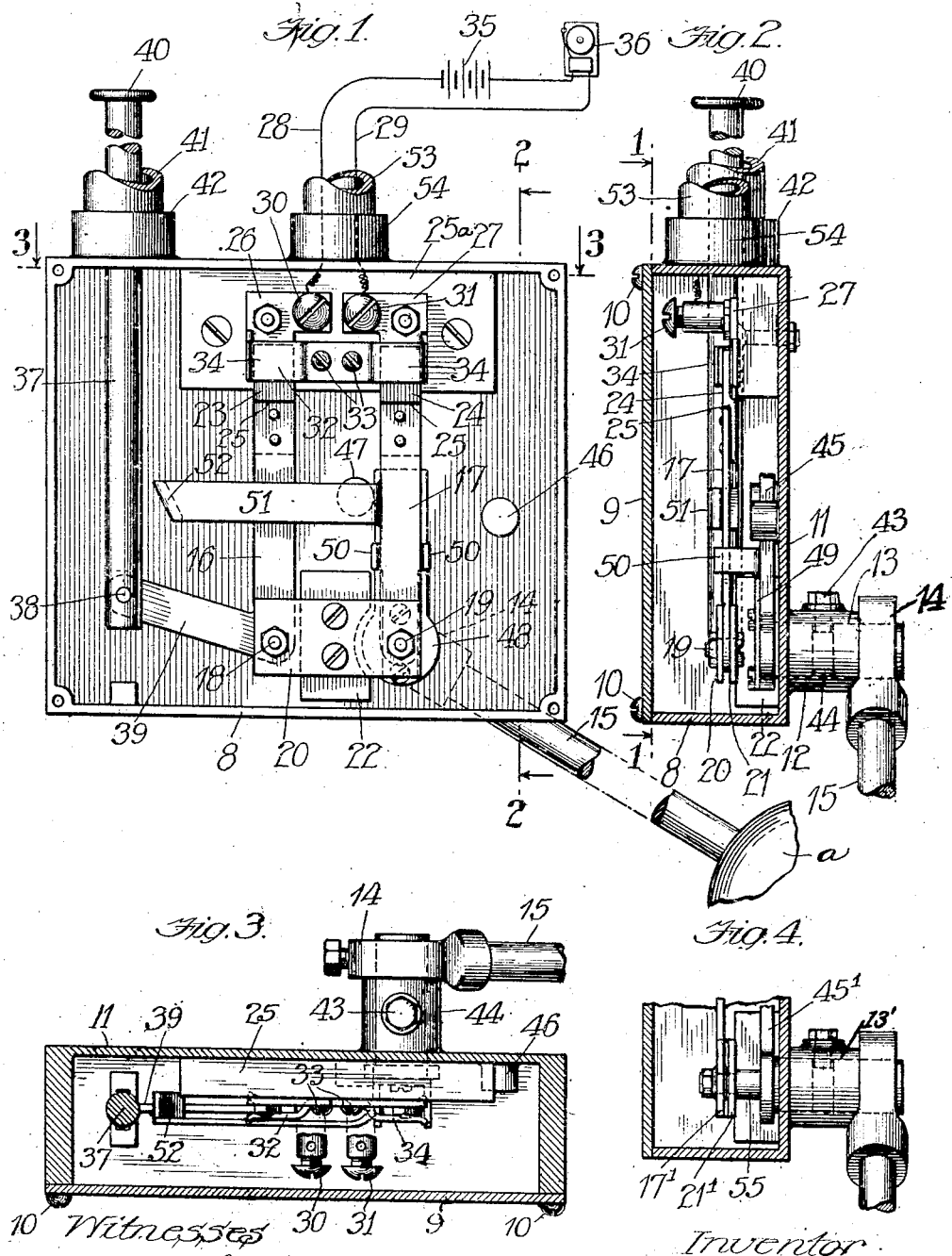

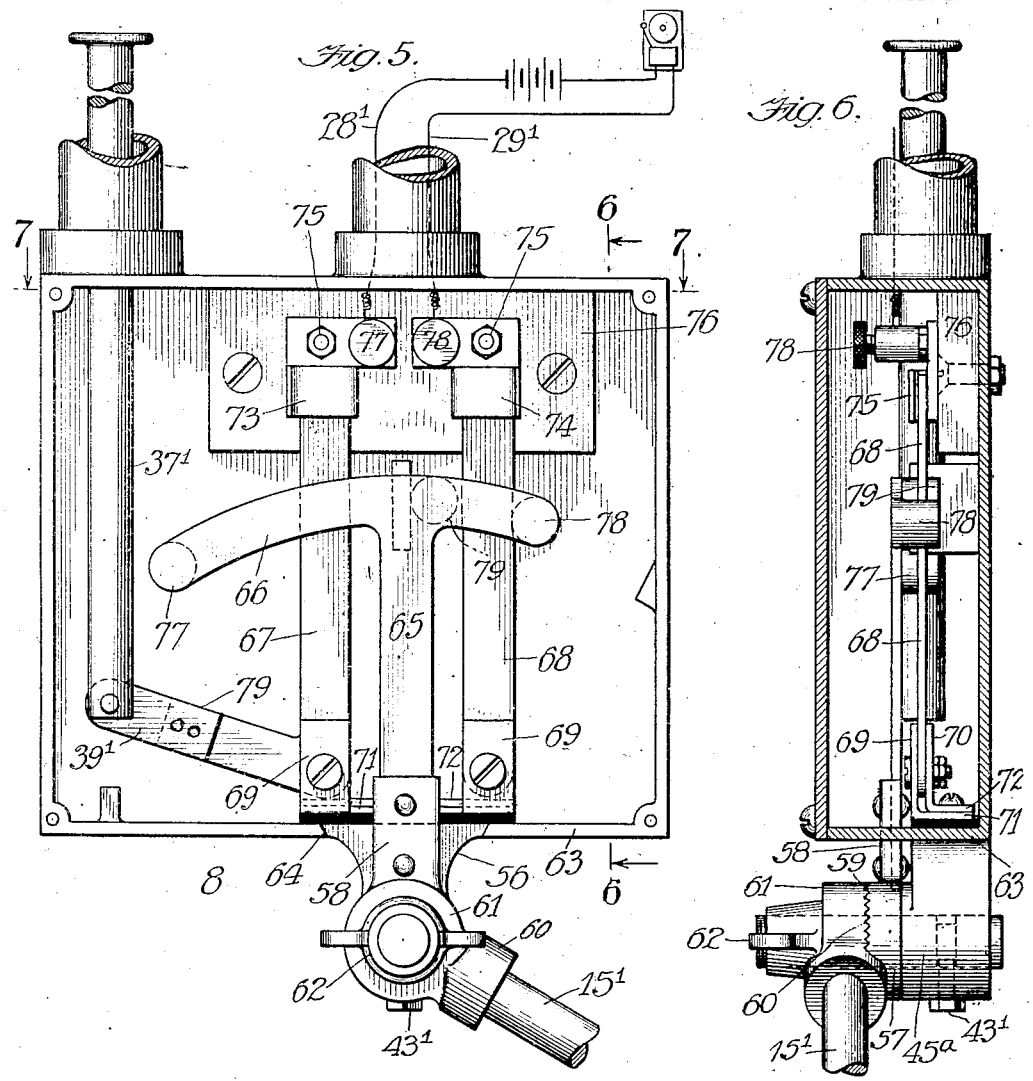

JAMES W. COX, OF WILMETTE, ILLINOIS, ASSIGNOR TO PACIFIC FLUSH TANK COMPANY, OF CHICAGO, ILLINOIS, A CORPORATION OF ILLINOIS.

ELECTRIC SWITCH.

1,269,684.    Specification of Letters Patent.    Patented June 18, 1918.

Application filed March 8, 1915.  Serial No. 12,813.

*To all whom it may concern:*

Be it known that I, JAMES W. Cox, a citizen of the United States, residing at Wilmette, county of Cook, and State of Illinois, have invented certain new and useful Improvements in Electric Switches, of which the following is a specification.

My invention is especially designed for use in connection with sewage treatment tanks, basins or beds such as those in which the so-called contact process is employed. In such systems of sewage treatment a series of tanks or basins is so built and connected to the sewage system that the material may be turned into the tanks for treatment *seriatim* that is to say the sewage is first caused to flow into one tank or group of tanks in the series to its capacity, when the supply of sewage is turned off from that tank or group of tanks into the next tank or group of tanks and so on. The sewage in each tank is permitted to remain there a definite predetermined period of time after which by the operation of a timing siphon, the construction of which is not material here, the sewage is drawn off. In some cases the stream of sewage is so regulated that each tank fills in a definite length of time and then after standing the required length of time is emptied by the siphon, the entire operation being automatic. In the system for which the present invention is more particularly designed, however, the flow of sewage is not or need not be regulated but when it has reached the desired depth in the tank or basin the operator is apprised thereof by a suitable signal and turns the sewage off from such tank or group of tanks, as the case may be, into another tank or group, and so on. The electric switch to which the present invention relates is designed for the purpose of controlling the current by which the signal referred to above is operated. For this purpose the switch is so constructed and arranged that it automatically closes the circuit when the sewage has reached the required depth in the tank, a float-operated contact being provided for the purpose. The construction is such that the bell or other signal remains in operation until manipulated by the attendant, the purpose being to insure his attention to the tank so that he may turn off the supply of sewage therefrom.

The switch is conveniently arranged so that at the same time the attendant in response to the signal shuts off the sewage he may break the circuit of the signal, which remains broken until the tank again fills.

From the following disclosure it will be apparent that my invention may be varied in many respects from the preferred forms described and shown in detail.

It will also be obvious that my invention may be employed in other connections than for the tanks of sewage systems and the construction itself may be modified without departing from my invention.

In the accompanying drawings and in the following specification I have shown and described two preferred forms of apparatus embodying my invention but it is to be understood that the specific disclosure is for the purpose of exemplification only and that the scope of the invention is defined in the following claims in which I have endeavored to distinguish it from the prior art so far as known to me, without, however, abandoning or relinquishing any portion or feature thereof.

Referring now to the accompanying drawings, Figures 1, 2 and 3 illustrate the preferred form of the invention, Fig. 1 being a side elevation with the cover of the casing containing the switch removed to reveal the interior, Fig. 2 a cross section upon the line 2—2 of Fig. 1 showing, however, the cover applied to the casing, Fig. 3 a section upon the line 3—3 of Fig. 1; Fig. 4 is a fragmentary section similar to Fig. 2 but of a slightly modified form; Figs. 5, 6 and 7 represent another form of the switch in side elevation with cover removed, a vertical section on the line 6—6 of Fig. 5 and a horizontal section on the line 7—7 of Fig. 5 respectively.

Referring now to the form of the invention disclosed in Figs. 1, 2 and 3, the casing 8 is a rectangular box preferably of cast metal and adapted to contain the switch and protect it as far as possible from water and injury from any other source or cause. A cover 9 is secured to the box by screws 10. The integral side wall 11 of the box is formed with a boss 12 which is bored for the reciprocation of a shaft 13 extending through the wall of the box and beyond the bosses where it receives at its outer end a collar 14 of a float rod 15.

The float a may be of any suitable character and sufficient buoyancy to operate the parts to be described when the sewage in the tank rises to the predetermined level. The switch proper comprises a pair of knives or blades 16—17 pivoted at 18—19 respectively between a pair of spaced plates 20—21 which are secured to or supported upon a block 22 mounted upon or formed integral with the permanent side wall of the casing. The knives 16—17 are capable of movement independent of each other and their upper ends are formed of separate contacts 23—24 which are insulated as at 25 (see Fig. 2) from the bodies of the knives. On the rear wall of the box or casing is secured by screws or otherwise an insulating block 25ª upon which are mounted stationary contacts 26—27 to which the leads 28—29 are respectively secured by screws 30—31. A strap or cleat 32 of somewhat resilient metal is secured at 33 to the insulating block, the ends of said strap, as at 34—34, overlying but spaced apart from the contacts 26—27 to provide for the reception of the knife contacts 23—24 between said strap and stationary contacts with sufficient pressure to secure electrical contact. The leads 28—29 are connected to a battery 35 and bell 36, both shown diagrammatically in Fig. 1. When the switch is closed, both knives being in the position shown in Fig. 1, the electrical connection in the switch is from the conductor 28, stationary contact 26, knife contact 23, strap 32, knife contact 24, stationary contact 27, to lead 29. By reason of the insulations heretofore described the current is confined to the path indicated, but it will be seen that the circuit is open unless both knives or pivoted contacts are in the closed position shown in Fig. 1. The knife 17 is controlled exclusively by the float heretofore mentioned, but the knife 16 is controlled both by the float and by an operating rod 37 pivoted at 38 to an arm 39 integral with or secured to the pivoted contact member 16 and extending upward to a position where it is easy of access and is provided with a handle 40. The rod is shown broken away in Fig. 1 for convenience of illustration, and surrounded by a protecting and guiding tube 41 which is secured within a boss 42 upon the casing.

The arbor or spindle 13 to which, as heretofore described, the float is connected is maintained in position by means of a screw bolt 43 entering an annular groove 44 intermediate the ends of said arbor, and the latter at its inner end is formed or provided with an arm 45 which extends upward therefrom and by coming into contact with the stops 46—47 serves to limit the extent of movement of the float. To the inner face of the arm 45 or of the circular head 48 formed upon the journaled spindle 13 is screwed a plate 49 having a pair of ears 50 extending upon opposite sides of the knife 17 so that the latter is moved in opposite directions with the movements of the float. If desired, the ears 50—50 may be so spaced apart as to permit lost motion between the arm 45 and the knife 17, or other obvious connections may be made between these parts, it only being essential that said knife be moved by the float. A lateral arm 51 is formed integral, with or attached to the knife 17 and extends over and beyond the knife 16 where it is turned inward, as at 52, into the plane of the knife 16 so that when the float falls it may operate said knife to drive it into engagement with the corresponding stationary contact.

A pipe 53 is fitted to a boss 54 formed integral with the casing and serves as a protection for the leads 28—29.

In use, the switch is installed in the tank with which it is to be used in such a position that the float attached to the rod 15 maintains the stop arm 45 in contact with the stop 47 when the sewage reaches the maximum level in the tank. At this time the parts are in the positions indicated in Fig. 1. As the liquid level lowers, due to the emptying of the tank, the weight of the float acting through the float rod, spindle stop arm, and one of the lugs 50 throws the knife or pivoted contact member 17 out of engagement with its stationary contact 27 and its movement continues until finally the float and connected parts are arrested by contact of the stop arm 45 with the stop 46. The same movement of the knife 17 causes the inwardly turned end of the arm 51 to engage the knife 16 and force the same into engagement with the stationary contact 26 and the overlapping conductor 32. As the liquid again rises in the tank the knife 16 remains in closed position and the knife 17 is gradually swung by the float to the left, as seen in Fig. 1, until ultimately it is forced into engagement with its contact 27 and the overlapping conductor 32. When this happens the circuit heretofore described is closed through the bell or other indicating or alarm mechanism, notifying the attendant that the sewage in the tank is at the maximum level. The attendant thereupon depresses the hand rod 37, thereby throwing the pivoted contact member 16 out of engagement with the stationary contact 26 and the conductor 32, thereby opening the circuit. At the same time he turns off the supply of sewage from the tank. When the level of the sewage again descends, the knife 16 is again brought into engagement with its contact and the overlapping conductor. The operation is repeated automatically and indefinitely.

The modification shown in Fig. 4 is distinguished from that just described in that the knife 17 is mounted directly upon the spindle 13¹ of the float. For this purpose the latter is reduced, as at 55, and extended beyond the stop arm 45¹ and through the bearing plate 21¹, and carries at its inner end the knife 17¹. Otherwise the construction is as described in connection with Figs. 1, 2, and 3. In this modification obviously the knife 17 is directly operated by the float.

In the modification shown in Figs. 5, 6 and 7, the float rod 15¹ is pivoted below the casing 8 which is provided with a downwardly extending bearing lug 56 for the purpose. The arbor or shaft 45ª is journaled in the bracket and secured against longitudinal movement by the screw 43¹ and the collar 57 having the upwardly extending arm 58 is suitably secured thereto and formed with a serrated face 59 which interlocks with a corresponding face 60 upon the collar 61 of the float rod. The inner end of the shaft 45ª is threaded and provided with a thumb nut 62 by which the collars 57 and 61 are secured in adjusted position. The floor or bottom 63 of the casing is slotted or cut away at 64 to permit of the proper amount of oscillation of the arm 58 and the switch operating member 65 is secured to said arm and extends upwardly therefrom, being provided with an arcuate cross head 66 for engaging the switch knives 67—68 in a manner to be presently described. The switch knives are pivoted between lugs 69—69 and 70—70 formed respectively upon the plates 71 and 72 and said plates are secured to but properly insulated from the bottom wall 63 of the casing. The knives 67 and 68 engage respectively clip contacts 73—74 secured by nuts 75—75 upon an insulating block 76 secured to the rear wall of the casing, and the leads 28¹—29¹ are connected to the stationary contact clips by ordinary binding screws 77—78. When the knives are in the position shown in Fig. 5 the circuit is closed through the battery and bell or other translating device, through the lead 28¹, contact clip 73, knife 67, plates 71—72, knife 68, contact clip 74 and lead 29¹. Obviously, however, if preferred, the knives and electrical connections might be formed, as described and shown in Figs. 1, 2, and 3. The arcuate contact operating member 66 is provided at each end with a stop 77, 78, and with an intermediate stop 79 all of insulating material, stops 78 and 79 serving to operate the knife 68 in opposite directions and stop 77 serving to close the knife 67 into its clip. The latter knife is connected to a hand operating rod 37¹, as in the first described modification. The lateral arm 39¹ is in the present construction, however, divided and insulated at 79 to prevent leakage of current.

The operation of this form of device will be apparent from the description of the operation of the first described form, the boss or projection 79 serving to open the switch 68 and the boss 77 serving to close the knife 67 as the level of the sewage falls, and the boss 78 serving to again close the knife 68 as the level of the sewage rises.

With either modification of my invention when the liquid attains nearly its maximum depth in the tank, the signal is continuously operated until the tank discharges unless in the meantime the attendant operates the hand rod for opening the contact connected therewith, so that the device will operate entirely automatically or automatically and manually as preferred.

I claim:

1. A switch of the character described comprising a pair of stationary contacts, a pair of independently pivoted contact members coacting with said stationary contacts respectively, means for electrically connecting said pivoted contact members, a common means for actuating one of said pivoted contact members into open and closed position and the other of said pivoted contact members into closed position, and manually operated means for actuating the second said pivoted contact member into open position.

2. In a device of the class described, a pair of stationary contacts, a pair of pivoted contact members adapted to engage the respective stationary contacts, means for electrically connecting the pivoted contact members, a float, connections from said float for opening and closing one of said pivoted contact members, connections from the float for closing the other of said pivoted contact members, and manually operated means for opening the second said pivoted contact member.

3. In a device of the class described, a pair of adjacent stationary contacts, a conductor arranged to overlap said contacts but spaced therefrom, a pair of pivoted contact members adapted to close connection between the respective stationary contacts and said conductor, and manually operated means for independently actuating one of said pivoted contact members and a float for actuating the other contact member.

4. In a device of the class described a pair of stationary contacts, a conductor arranged between but insulated from said stationary contacts, a pivoted contact member adapted to close the circuit between one of said stationary contacts and said conductor, manually operated means for actuating said pivoted contact member to break the circuit, a second pivoted contact member adapted to close the circuit between the other of said stationary contacts and said conductor, a float and connections from the float for closing the first said pivoted contact member and opening and closing the second said pivoted contact member.

5. In a device of the class described, a pair of adjacent stationary contacts, a pair of independently pivoted contact members adapted to engage the respective stationary contacts, manually operated means engaging one of said pivoted contact members for opening the same, a float, connections from the float to the last mentioned pivoted contact member for closing the same, and connections from the float to the other pivoted contact member for opening and closing the same.

6. In a device of the class described, a pair of adjacent stationary contacts, a pair of pivoted contacts coöperating with the respective stationary contacts, a manually operated means for actuating one of said pivoted contact members in one direction, a pivoted float, an arm connected thereto and connected and arranged to operate the last mentioned pivoted contact member in one direction and the other pivoted contact member in opposite directions.

7. In a device of the class described, a casing, a pair of stationary contacts arranged thereon, a pair of movable contact members pivoted thereto, a hand operated rod connected to one of said pivoted contact members to move the same in one direction, a float pivoted on said casing, an arm connected to the float, means connected to the arm and engaging the last mentioned pivoted contact member to close the same, and means on said arm for operating the other pivoted contact member in both directions.

8. In a device of the class described, a casing, a pair of stationary contacts arranged thereon, a movable contact pivoted on the casing and adapted to engage one of said contact members, a manually operated rod engaging said pivoted contact member for operating the same in one direction, a shaft pivoted in the casing, a float rod fixed to said shaft, a float on the float rod, an arm secured to the shaft, a second contact member pivoted on the casing, means on said arm engaging the last said pivoted contact member for operating the same, and means on the last said pivoted contact member engaging the first mentioned pivoted contact member for operating the same.

JAMES W. COX.

Witnesses:
ROBERT DOBBERMAN,
FIDELIS MAICHEN.